United States Patent [19]
Giles et al.

[11] Patent Number: 5,173,725
[45] Date of Patent: Dec. 22, 1992

[54] CAMERA MOUNT FOR A BOAT

[76] Inventors: Carl L. Giles, 18352 Tiller Trail Hwy., Days Creek, Oreg. 97429; Steven D. Giles, 1064 Lisa Way, Myrtle Creek, Oreg. 97457

[21] Appl. No.: 803,994

[22] Filed: Dec. 9, 1991

[51] Int. Cl.$^5$ .............................................. G03B 29/00
[52] U.S. Cl. ...................................................... 354/81
[58] Field of Search ............... 354/75, 76, 81; 358/93; 352/243; 248/640-643

[56] References Cited
U.S. PATENT DOCUMENTS
4,621,786 11/1986 Greenlee ................................ 354/81

Primary Examiner—Michael L. Gellner
Assistant Examiner—David M. Gray
Attorney, Agent, or Firm—James D. Givnan, Jr.

[57] ABSTRACT

A camera mount for installation on a boat for filming water skiers and other subjects. A base for boat attachment supports a fully rotatable turret on which is provided a ski rope receiving hook. Bearings permit rotational movement with a drag provided to prevent over travel of the camera. An adjustable mounted camera platform permits filming of subjects at different ranges from the boat as well permitting convenient camera removal from the boat.

10 Claims, 1 Drawing Sheet

CAMERA MOUNT FOR A BOAT

BACKGROUND OF THE INVENTION

The present invention pertains to a camera support for the filming of a moving subject from a boat or the like.

The filming of a moving subject from a boat requires considerable skill. Attempts by amateur photographers who accurately film water skiers during the course of various maneuvers commonly result in the flim coverage being of erratic quality or in some instances entirely unusable. In certain types of competitive water skiing it is desirable that a film record be made of the water skier.

Recreational water skiers may wish to record their water skiing efforts without relying on hit and miss camera efforts of a photographer using a hand held camera.

U.S. Pat. Nos. 4,498,744; 4,615,597; 4,420,238; 4,579,434; and 4,093,364 are of some interest but do not disclose devices suitable for present purposes.

SUMMARY OF THE INVENTION

The present invention is embodied within a camera mount including a platform positioned in response to rope imparted forces for the purpose of making a film record of a water skier's performance.

The present camera mount includes a base for installation on a suitable surface of a watercraft. The base is preferably attachable to the post or pylon commonly found on water ski boats of the tournament class. Provision is made for installation on other types of watercraft. A spindle on the base pivotally supports a turret for rotation about an upright axis. The turret receives an end of a ski rope and is free to rotate in response to rope imparted forces. Pivot means within the turret are adjustable to provide a drag on the turret to prevent excessive turret movement. In place on the turret is a platform on which the camera may be mounted. Adjustable components interposed between the turret and the camera platform permit adjustment of the platform about at least a horizontal axis for different camera ranges.

Important objectives of the present invention include the provision of a camera mount for installation on a moving support to provide for automatic tracking of a water skier by a camera; the provision of a camera mount for a boat which is compatible with existing structure of some watercraft to avoid modification of the watercraft; the provision of a camera mount using a bearing assembly which may be adjusted to impart drag to a camera supporting turret to prevent excessive turret movement by rope imparted forces; the provision of a camera mount for supporting a camera for movement entirely about an upright axis or 360 degrees in response to forces imparted by a water ski rope or by manual effort.

DETAILED DESCRIPTION OF THE PREFERRED EMBODIMENTS

Figures 1, 2:
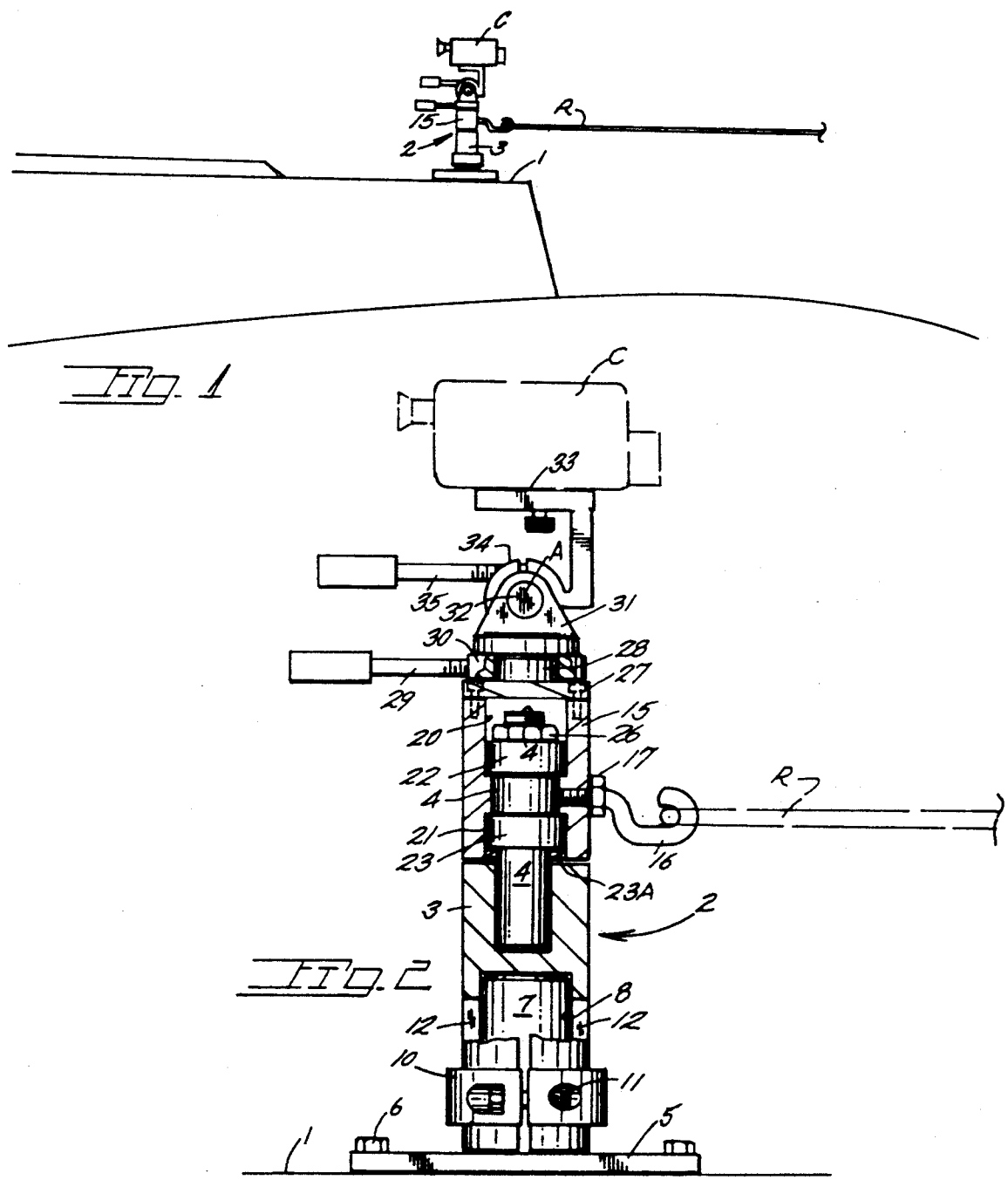
FIG. 1 is a fragmentary side elevational view of a boat with the present camera mount in place thereon.
FIG. 2 is an enlarged side elevational view of the present camera mount with fragments broken away for purposes of illustration.

With continuing attention to the drawings wherein applied reference numerals indicate parts similarly hereinafter identified, the reference numeral 1 indicates a surface of a watercraft capable of supporting the camera mount indicated generally at 2.

A base 3 of the camera mount carries an upright spindle 4 which projects upwardly above the base for reception of a later described turret. For those boats not including a post or pylon, the present base includes a plate 5 for securement as at 6 to boat surface 1. A pylon or post 7 projects upwardly from plate 5. Base 3 defines a bore 8 to receive post 7 in a sliding fit. A locking ring 10 includes a fastener element 11 for purposes of securing base 3 to post 7. To facilitate such locking of the base in place, the base may be provided with a series of axially extending slots 12.

A turret at 15 is equipped with a rope attachment member or anchor 16 to which a ski rope R is attachable. A jam nut 17 secures attachment means 16 in place. The turret is counterbored at 20 and 21 to receive the outer race of internally disposed tapered roller bearings 22 and 23. The upper end of post 4 is threaded to receive a nut 26 to confine bearing 22 in place which in turn retains base turret 15 in place against axial displacement. A bearing seal is at 23A.

A closure 27 is suitably mounted to the upper end of turret 15 as by machine screws. The closure preferably includes a boss 28 about which may be secured in place a circular clamp 30. A threaded lock 29 acts on clamp 30. A clevis 31 is integral with clamp 30 and carries a platform 33 on which a camera C may be mounted. For adjustment purposes, the platform member 33 may be integral with a split collar 34 having a threaded lock 35 to permit positioning of the platform about a horizontal axis at A of a pin 32.

In use, the tapered roller bearings within the turret are adjusted by nut 26 to provide the desired amount of drag on the turret. The positioning of camera C about the axis A of pin 32 will accommodate the changes in range of the subject resulting from the use of different lengths of ski rope.

Clamp 30 permits convenient removal of the platform and camera from the turret without the aid of special tools. The present camera mount permits manual rotation of the camera about an upright axis for the filming of other subjects, landscapes, boats, etc., with camera travel through 360 degrees. Rope R would, of course, be detached for such use.

While we have shown but one embodiment of the invention, it will be apparent to those skilled in the art that the invention may be embodied still otherwise without departing from the spirit and scope of the invention.

Having thus described the invention, what is desired to be secured by a Letters Patent is:

1. An automatically tracking camera mount for installation on a boat for use in the continuous automatic filming of a water skier towed at the end of a ski rope pulled by the boat, said mount comprising, a base for attachment to the boat, a turret for travel about a rotational axis, a ski rope anchor on said turret and offset from said rotational axis, pivot means coupling said turret to said base for turret movement about said rotational axis in response to ski rope imparted forces acting on said rope anchor, adjustable means permitting varying of resistance to turret movement, and a platform carried by said turret and on which a camera may be installed.

2. The camera mount claimed in claim 1 wherein said base includes a post and a plate for securement to the boat.

3. The camera mount claimed in claim 2 wherein said base includes a slotted sleeve, a locking ring for securing the sleeve to said post.

4. The camera mount in claim 1 additionally including adjustable and lockable means carried by said turret and supporting said platform.

5. The camera mount claimed in claim 1 wherein said adjustable means includes a tapered roller bearing having a nut element.

6. In combination, a turret including a rope anchor offset from the axis of rotation of the turret for receiving one end of a water ski rope, a base for attachment to a boat, pivot means rotatably coupling said turret to said base and including adjustable means acting on said turret to inhibit turret rotation, a camera platform on said turret on which a camera may be installed, and said turret and said camera platform movable in response to forces imparted to the turret by the ski rope to film a subject at a remaining end of the rope using a camera installed on said platform.

7. The combination claimed in claim 6 additionally including adjustable and lockable means interposed between said turret and said platform to support the latter in an adjustable manner.

8. The combination claimed in claim 6 wherein said adjustable means includes a tapered roller bearing and a nut element.

9. In combination, a watercraft, a ski rope for towing a water skier and attached at one of its ends to said watercraft, a camera mount including a base in place on said watercraft and including a turret rotatable about an upright axis, a ski rope anchor on said turret and offset from said upright axis, pivot means coupling said turret to said base for turret movement about said upright axis in response to ski rope imparted forces on said rope anchor, adjustable means imparting a drag on rotational movement of said turret, a platform carried by said turret and on which a camera may be installed.

10. The combination claimed in claim 9 wherein said adjustable means is a bearing housed within said turret and including an adjustable nut element.

* * * * *